United States Patent [19]
Forsyth et al.

[11] 3,966,220
[45] June 29, 1976

[54] VARIABLE LENGTH VEHICLE

[76] Inventors: Robert W. Forsyth; John P. Forsyth, both of 1517 N. 3rd Ave., Upland, Calif. 91786

[22] Filed: Jan. 7, 1974

[21] Appl. No.: 431,383

Related U.S. Application Data

[62] Division of Ser. No. 293,797, Oct. 2, 1972, Pat. No. 3,896,946.

[52] U.S. Cl. .............................. 280/638; 280/80 B; 280/87 R
[51] Int. Cl.² ......................................... B62D 21/14
[58] Field of Search .............. 280/34 B, 34 R, 80 A, 280/80 B, 87 R, 106 R; 180/1 F, 25; 296/26

[56] References Cited
UNITED STATES PATENTS

| | | | |
|---|---|---|---|
| 1,470,811 | 10/1923 | Cook | 280/34 R |
| 2,488,123 | 11/1949 | Hartry | 280/34 R |
| 2,511,692 | 6/1950 | Brown | 280/87 R X |
| 2,559,935 | 7/1951 | Brown | 280/80 A |
| 3,633,934 | 1/1972 | Wilfert | 280/106 R |
| 3,802,716 | 4/1974 | Wiers | 280/34 R |

*Primary Examiner*—M. H. Wood, Jr.
*Assistant Examiner*—Terrance L. Siemens
*Attorney, Agent, or Firm*—Roger A. Marrs

[57] ABSTRACT

Transportation Apparatus is disclosed herein involving a system whereby small electrically driven vehicles are carried in a transporter vehicle. A loader is movably mounted on the transporter for loading and unloading the small vehicles onto the transporter in selected storage spaces. Each small vehicle is provided with a telescoping frame for shortening the wheelbase for storage purposes and for extending the wheelbase for independent vehicle operation on surface roadways. The transporter vehicle and small electrically driven passenger vehicles are adapted to operate combined on, or independently use in common, traffic arteries such as highways or expressways and surface streets.

2 Claims, 6 Drawing Figures

VARIABLE LENGTH VEHICLE

This is a division of application Ser. No. 293,797 filed Oct. 2, 1972, now U.S. Pat. No. 3,896,946.

RELATED REFERENCE

This application is cross-referenced with applicant's co-pending application for U.S. Letters Patent entitled, "Vehicular Transporation System and Apparatus", having Ser. No. 124,808; filed Mar. 16, 1971, now U.S. Pat. No. 3,785,514, and the disclosure therein is included in this present application by this reference.

BACKGROUND OF THE INVENTION

1. Field of the Invention

This invention relates to interurban/intracity transporting systems and, more particularly, to a novel system and apparatus incorporating options for presonal-choice travel in which a plurality of individual self-propelled satellite passenger vehicles or cars are selectively combined in a controlled group of vehicles in a transporter vehicle for travelling at a common, uniform speed along a main traffic artery and which are adapted to be diverted or separated from the controlled group at the selection of the driver for each of the individual vehicles or cars at selected stop locations of the transporter vehicle.

2. Description of the Prior Art

Man's improved technology has wrought tremendous advantages in many fields, but relatively little has been done in the field of interurban/intracity transporation systems that has practical value. The prior art in the field may be viewed, for the sake of brevity, as consisting of two broad categories - the existing, currently used conventional transporation systems, private and public; and the various experimental and developmental transporation systems proposed for use in the near future.

The first category is comprised of the internal-combustion engine automobile operating on existing street and road networks and subject to various traffic-flow control devices; public transit bus systems, and trolleys, both those operating on rails and the externally powered, so-called trackless trolleys; public, right-of-way, rail transit systems; and public, right-of-way, suspended or straddle-type monorail transporation systems. The second category is comprised of hybrid-type automobiles, powered by various combinations of heat-engines and electric power and drive systems, and electrically driven automobiles receiving energy from batteries and fuel cells, both types proposed for operation on existing public street and road networks; dual-mode transporation systems in which small automobiles or bus-like vehicles, incorporating conventional, electrical, or hybrid propulsion systems, may operate in a self-propelled mode on public street and road networks, or may operate on a guideway, track, or monorail system providing external power and automated traffic-flow controls; dual-mode transporation systems in which the vehicles, in the controlled mode, incorporate means of the creation of, and maintenance of air-cushions for vehicle support, suspension, and/or tracking; tube-type transportation systems in which vehicle motion is achieved by gravity, vacuum, or electrical means, air screws, thrust engines, etc.; and public, high-speed, right-of-way transporation systems comprised of single cars or trains, operating on rails or guideways, supported by wheels, air-cushions, or electromagnetic levitation.

The disadvantages of the prior art, both in existing and proposed transporation systems, are many, however, the most important relate to problems of environmental pollution, lack of provision for personal-choice travel, unsatisfactory economics, and an inherent potential for rapid obsolescence. For example, primary dependence on use of the internal-combustion engine automobile for interurban/intracity travel is a major cause of air pollution, traffic congestion, and noise pollution, and, while a one-for-one conversion to electrically or hybrid powered vehicles may be expected to reduce air pollution, perpetuation of the same private-vehicle use patterns would not alleviate congestion or reduce noise pollution, nor would it reduce constantly increasing requirements for more streets, highways, and parking areas which are expensive to construct, aggravate tax-base problems, and represent poor land utilization. Transit bus and trolley systems also have serious drawbacks, which would not be altogether eliminated by a change to low-pollutant power systems. The most basic problem lies in the fact that transit bus and trolley systems are not flexible enough to be truly responsive to the needs of the individual passenger - they cannot provide personal-choice travel. Characteristically, too, such systems cannot offer a really pleasant travel environment. Consequently, they cannot complete effectively with the private automobile. This leads to underutilization and unprofitable operations.

Right-of-way, rail transporation systems (contemporary and advanced high-speed types), tube systems, monorails, and tracked, air-cushion systems are potentially vulnerable to underutilization, too, because they also cannot compete with the freedom, privacy, and pleasant environment the private automobile offers. However, a far more critical problem is created by the enormous capital outlays needed to acquire rights-of-way and fund the construction of inflexible, single-function, geographically-fixed systems which may quickly be made obsolete by advances in technology, changing use patterns, and changes in population distribution.

Dual-mode transportation systems, based on the use of some type of guideway or track network with external power sources and automated traffic-flow controls, could generally be made flexible enough to provide personal-choice travel, and privacy and a pleasant environment in individual, dual-mode, street/guideway vehicles. Nonetheless, all such systems now in development or proposed also are severely handicapped in practical application by complexity, requirements for expensive rights-of-way, the costs of constructing and operating power distribution systems in the guideway or track to supply external power to the individual vehicles in the guide mode, and the need for some type of mechanical or electromechanical means of assuring that all vehicles using the guideway or tracks are inspected immediately prior to such use to assure their maintenance to uniform mechanical and functional standards to prevent system malfunctions and service interruptions caused by vehicle breakdowns.

Illustrative of these drawbacks in developmental and proposed dual-mode transporation systems is a prior attempt to provide an automatic vehicular monorail transportation system disclosed in U.S. Pat. Nos. 3,101,677; 3,143,020 and 3,118,392 which generally provide for an automatic vehicular monorail system in which self-propelled vehicles automatically move from station to station with little or no manual control required. Conventional internal-combustion engine passenger vehicles are employed which are modified to include a receiver structure secured to the roof thereof adapted to be detachably engaged with a pick-up member movably carried on a conveyor system. Obviously, such a system encounters a variety of problems and difficulties involving first, the securement of the receiver member onto the conventional car and, secondly, providing a means for stabilizing the car once it has been picked up by the conveying system. Another difficulty resides in the fact that the system is not readily adapted for high speed operation in foul weather environments and the mechanism necessary to effect pickup and detachment of the cars on an individual basis is extremely cumbersome and, in its exposed position, is liable to damage which could cause malfunctions when engaged with the conveyor resulting in system breakdowns and service interruptions. It will also be noted that application of the system entails acquistion of rights-of-way for the monorail and obviously would require substantial capital outlays to build the monorail structure and conveyor mechanism. Furthermore, such a system seriously suffers from a control point of view since no means are provided for varying the spacing between one or more cars once the car has been combined with the conveyor system.

In addition, transpoation systems which employ conventional vehicles having internal combustion engines do not alter the serious air pollution conditions existing in major cities. Major modification is required to convert such conventional vehicles for use in automatic control systems wherein programmed processing of a plurality of vehicles is anticipated not only for system flexibility but for safety purposes.

Furthermore, conventional vehicles utilize a rigid frame support that establishes a predetermined wheelbase which fixes the overall length of the vehicle. Therefore, a vehicle may have sufficient wheelbase for roadability but the wheelbase may be too long for storing a plurality of such vehicles is a controlled group. Such a stored group must be as compact as possible so that the group can be accommodated by the transportation system such as when a transporter or carrier vehicle is employed.

Therefore, a need has long been present for a truly practical interurban/intracity transportation system which successfully combines the advantages of mass rapid transit with the freedom of personal-choice travel and the pleasant environment afforded by the private automobile, which is economical, adapted for programmed control and which permits employment of individual vehicles operable in a controlled grouping on a predetermined course or main traffic artery or separately operable as an independent vehicle on conventional roadways and surface streets under its own power.

SUMMARY OF THE INVENTION

Accordingly, the novel transportation system and apparatus of the present invention obviates the problems and difficulties encountered with prior systems and equipment and provides a continuous flow concept in which small satellite passenger vehicles or cars incorporating a power means are used in a self-propelled mode on conventional roadways and surface streets. A transporter vehicle is employed for transporting a plurality of these satellite passenger vehicles or cars on a conventionally designed rapid transit main traffic artery or freeway.

The transporter vehicle is provided with an elongated storage area divided into a plurality of storage spaces for accommodating parking and storage of a plurality of the passenger vehicles. A leader mechanism is movably carried along opposite sides of the transporter vehicle storage area whereby individual and selected passenger vehicles may be loaded into a particular storage space. The loading mechanism includes means for engaging with a selected passenger vehicle, lifting the vehicle to the level of the storage area and means for aligning the vehicle with the selected storage space. The loading mechanism is hydraulically or electrically actuated by the driver of the transporter. The storage area of the transporter includes a longitudinally disposed curb which separates the storage area into two rows of storage spaces so that the passenger vehicles may be loaded from either side of the transporter. A feature of the transporter resides in the fact that the width of the storage area is substantially reduced in dimension from the combined length of a pair of passenger vehicles with extended wheelbase so that the transporter will readily travel on conventional roadways without any excessive overhang or extra wide construction.

Each controlled group of transporter vehicles may be under the direction of a remote radio control system so as to determine safe and convenient spacing or intervals between adjacent controlled transporter vehicle groupings or single transporter vehicles. The satellite passenger vehicles or cars may also be individually self-propelled on surface streets and highways used in common with the transporters.

A feature of the invention resides in the fact that the satellite passenger vehicle or car is fully equipped with a power means, preferably an electrical traction or induction type motor, drive train, steering mechanism, and braking system.

Means are provided on each satellite passenger vehicle or car for extending and retracting the frame so as to provide a variable wheelbase for the vehicle. When the vehicle is in its roadable condition for travel on conventional roadways and highways, such means is extended so that the maximum wheelbase dimension is available. However, when the vehicle is placed in its specific storage space on the transporter, the means is actuated so as to shorten the wheelbase dimension whereby the overall length of the vehicle is reduced. By this means, the width of the transporter vehicle may be reduced and a pair of satellite passenger vehicles facing each other may be readily accommodated within the width dimension of the transporter. One embodiment of such means includes a telescoping frame separating the rear wheels from the front wheels wherein the rear portion of the frame is stationary and the front section of the frame telescopes with respect to the rear portion. Means are provided for actuating the telescoping front section so as to extend and retract under the control of the vehicle operator. The forward frame section can cooperate with the loader device on the transporter vehicle during retraction and extension upon engagement of its front wheels with a fixed stop during loading and unloading procedures.

Therefore, it is a primary object of the present invention to provide a vehicular transportation system which includes a plurality of individual, self-propelled satellite vehicles, or cars, adapted to travel in a combined group on a transporter vehicle at a common, uniform speed along a main transit course or traffic artery wherein the transporter vehicle includes a loading mechanism for selecting a storage space on the transporter vehicle and for loading a selected satellite vehicle into said space.

Another object of the present invention is to provide a novel transporter vehicle for carrying a plurality of small vehicles, or cars, having means for loading and unloading the vehicles or cars to and from selected storage spaces located on the transporter.

Another object of the present invention is to provide a novel transporter vehicle for carrying a plurality of small cars which are normally self-propelled that includes loading means operable with respect to a plurality of storage spaces for loading a particular small car into a preselected storage space in the transporter's storage area.

Yet another object of the present invention is to provide a novel transportation system including a transporter vehicle for carrying a plurality of smaller vehicles wherein each of the smaller vehicles includes means for bearing the overall length of the vehicle so that the plurality of vehicles can be grouped in a minimum space area on the transporter.

Still another object of the present invention is to provide a novel satellite passenger vehicle which is self-propelled and adapted to be loaded onto a transporter vehicle wherein the satellite vehicle includes means for extending and retracting its wheelbase for compact storage on the transporter.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

DESCRIPTION OF THE PREFERRED EMBODIMENT

The subject matter of the present invention relates to co-pending application referenced above, the substance of which is incorporated herein by such reference, and the present invention deals with components for the transportation system described therein which, by their design, novelty and interrelationship, enhance the flexibility of the basic system and greatly facilitate its implementation by eliminating need for particular elements thereof. However, it is to be understood that certain portions of the novel invention disclosed herein have application and utility separate and distinct from their use as components of the above referenced transportation system.

Figure 1:
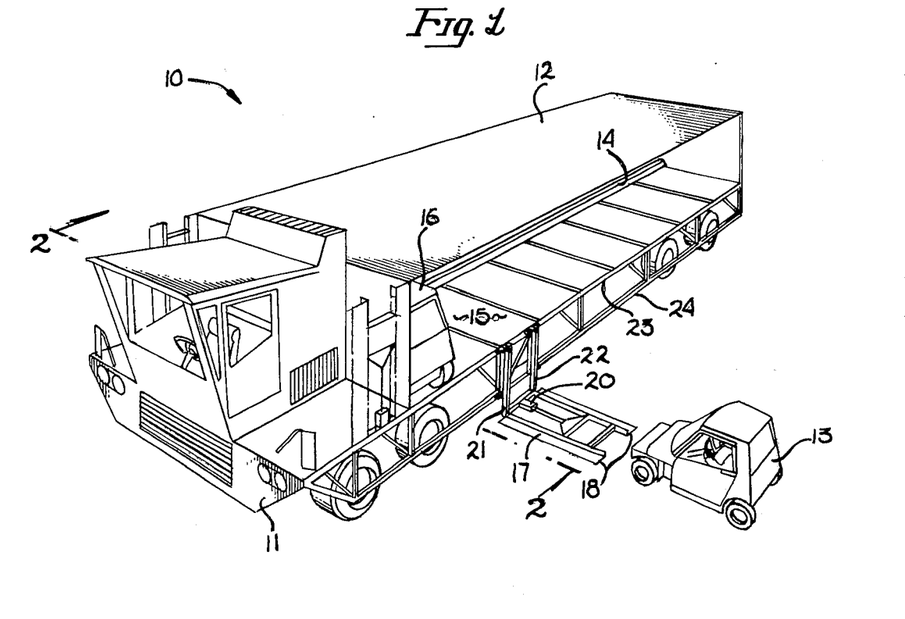
FIG. 1 is a perspective view of the novel transporter and small passenger vehicle incorporating the present invention and illustrating the passenger vehicle in position to be loaded onto the transporter.

Referring now to FIG. 1, a transporter vehicle is identified in the direction of arrow 10 which includes a cab 11 for housing the operating controls of the vehicle, and such components as the engine, drive train and the like. Immediately behind the cab 11, there is provided an elongated, enclosed compartment 12 constituting a storage area into which a plurality of small satellite passenger cars 13 may be housed. The storage area within enclosure 12 is divided into two rows of storage spaces by a central curb 14 which extends the full length of the compartment. One of the storage spaces is identified by numeral 15. It can be seen that one of the small passenger vehicles has already been loaded and is identified by numeral 16.

A loading mechanism is indicated by numeral 17 for lifting a selected small passenger vehicle vertically to the level of a selected parking or storage space whereby the selected vehicle may be moved from the surface level to its stored position in the parking or storage space. The loading mechanism 11 includes a platform 18 adapted to receive the wheels on the sides of the car so that the car may be driven upon the platform. A motor 20 through a conventional gear train lifts the platform on vertical rails 21 and 22 so that the passenger vehicle or car is elevated to the level of the parking or storage space 15. It is to be particularly noted that the vertical rails 21 and 22 are slidably carried on elongated side rails 23 and 24 downwardly depending from the compartment 12 and cab 11. Also, it is to be understood that an identical arrangement is shown on the opposite side of the transporter 10 for loading and unloading passenger vehicles with respect to the opposite side of the transporter.

As illustrated, car 16 has been placed in the first space on the left side of the vehicle. The loading/unloading mechanism 17 on the left side of the transporter is shown moved to the third station or space 15 and platform 18 is lowered to ground level so that another satellite passenger car 13 may be driven onto the platform and raised to the deck level of the transporter vehicle. Car 13 is driven to this position and onto the platform by the driver of the vehicle. It is to be noted that the loading/unloading device 17 is illustrated in its stowed position on the right side of the vehicle and is illustrated in broken lines in the stowed position on the left immediately adjacent the cab 11. In the stowed position, the loading/unloading device is raised to deck level, platform 18 is rotated 90° upwardly and secured against inadvertent movement.

Figure 2:
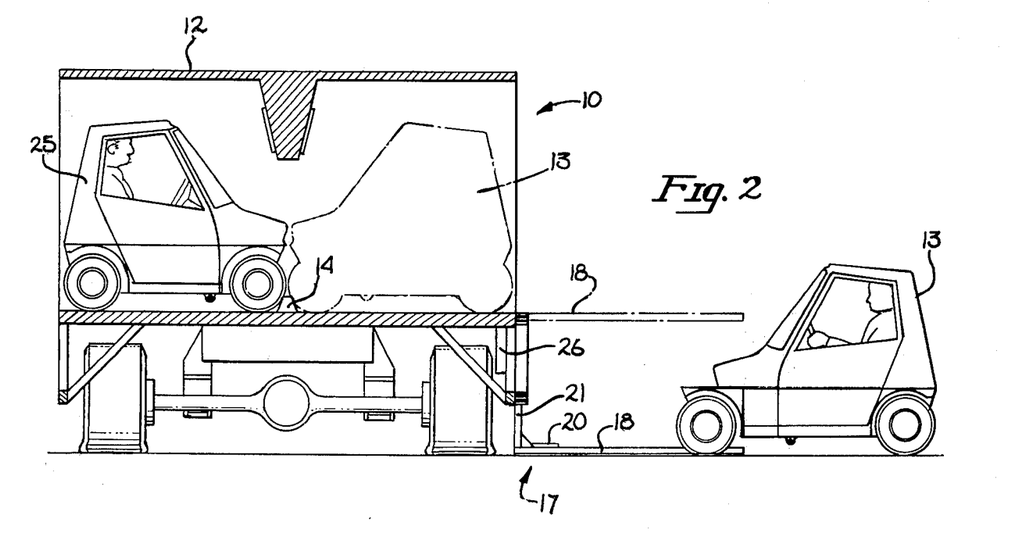
FIG. 2 is an enlarged transverse cross-sectional view of the transporter and the passenger vehicle shown in FIG. 1 and illustrating the passenger vehicle frame in its extended position preparatory to loading.

As illustrated in FIG. 2, the satellite car 25 is shown loaded and secured in its storage space on the transporter within enclosure 12. On the other side of the enclosure, the loading/unloading device 17 is at ground level and satellite car 13 is being driven onto platform 18 so that it may be raised to the deck level of the storage area and then driven under its own power into empty space 15. The broken line showing of car 13 in the space illustrates its position on completion of the operation. A motor 20 is employed for raising the platform from ground level to the deck level.

With further reference to FIG. 2, it is to be noted that the satellite car 25 in the storage space within compartment 12 illustrates the car's frame in the retracted, or telescoped position so as to reduce its wheelbase enabling the car to be accommodated within the width of the storage space. The satellite car 13 on the ground preparatory to movement onto platform 18 is illustrated with its frame in the extended position. Once on the loader platform 18, the vehicle's frame will be retracted, or telescoped, so as to shorten the wheelbase whereby the car will fit in the storage space as shown in broken lines. The objective of this feature is to make possible lateral loading and positioning of the vehicles on the transporter 10 having a sufficiently small, overall width to comply with legal limits for highway travel, and yet provide the satellite cars with a sufficient wheelbase to enhance their automotive performance when they are operated independently under their own power.

Figure 3:
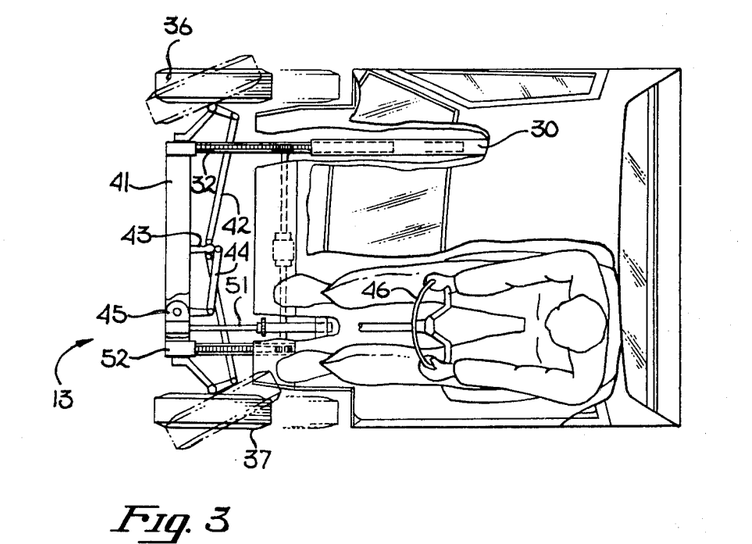
FIG. 3 is a top plan view of the passenger vehicle, having the roof broken away to expose the interior, illustrating the extendable vehicle frame.
Figure 4:
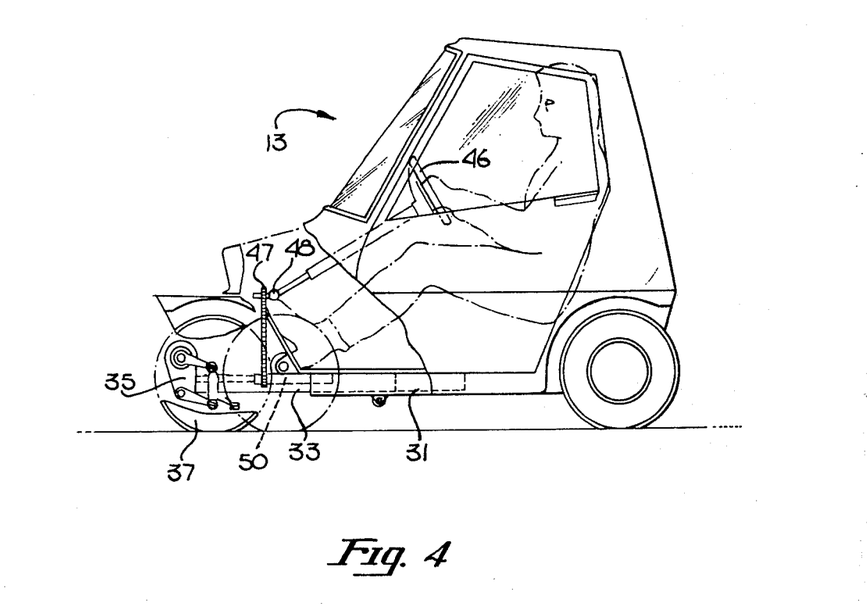
FIG. 4 is a side elevational view of the passenger vehicle shown in FIG. 3.
Figure 5:
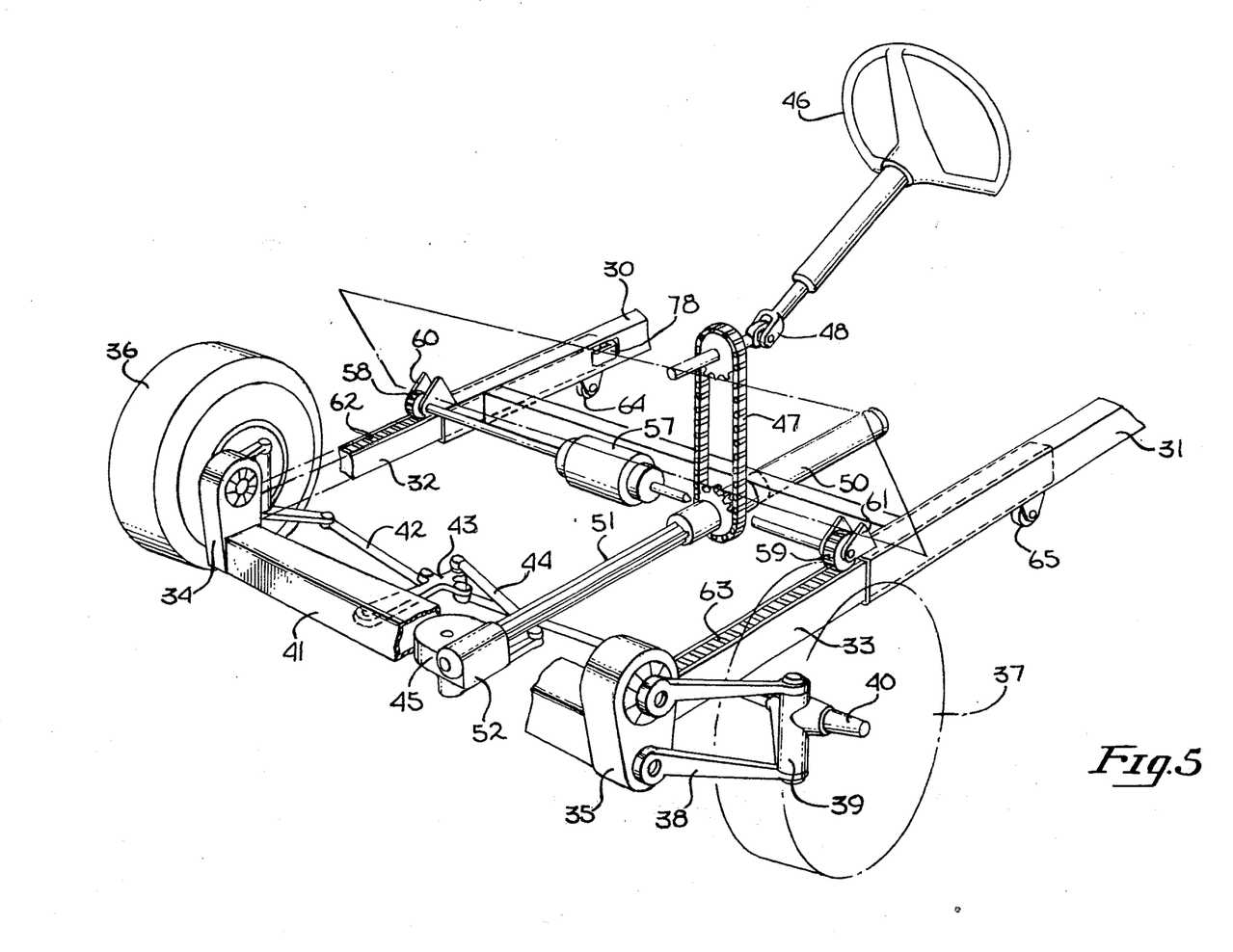
FIG. 5 is a perspective view of the variable length frame mechanism showing the telescoping relationship of the frame sections.

Now in reference to FIGS. 3, 4 and 5, the typical satellite car 13 is illustrated, partially cut away to show the mechanical arrangement with enables extension and retraction of the car's frame to increase or decrease the wheelbase. Vehicle 13 includes a pair of parallel, fixed spaced-apart frame members 30 and 31 which are to be considered stationary frame members, and the after portion of these frame members is operably connected to the rear wheels of the vehicle. The forward portion of the vehicle's frame comprises movable frame sectional 32 and 33 which are telescopically mounted in the ends of frame members 30 and 31, so as to extend outwardly from or retract into the frame members respectively. The extreme forward end of the movable frame sections or members 32 and 33 carry the front suspension as indicated by numerals 34 and 35. The suspension arrangement may be of any suitable type, but for the purposes of this invention, a torsilastic suspension has been found desirable. Front wheels 36 and 37 are operably secured to the suspension mounts 34 and 35 respectively by suitable arms such as indicated by numeral 38, kingpins 39 and spindles 40. The suspension mounts 34 and 35 are arranged in fixed spaced-apart relationship and are maintained in connection by a box member 41 extending transversely across the front of the vehicle. Therefore, as the extendable frame sections 32 and 33 are moved forward, the front suspension, including the front wheels depending therefrom, are moved forward also whereby the wheelbase of the car is lengthened. Alternatively, as the extendable frame sections 32 and 33 are retracted or telescoped into the fixed, tubular frame members 30 and 31, the wheelbase of the car is shortened.

As will be especially noted in FIGS. 3 and 4, the means of frame or wheelbase extension provides ample, normal leg space for passengers in the car regardless of the position of extendable sections of the frame, and yet, with the wheelbase of the car extended to its maximum dimensions, full clearance is provided for angular displacement of the front wheels about their respective kingpins so that, if desired, an Ackermann steering system may be used for directional control of the car when it is operated independent of the transporter. A typical Ackermann steering system is indicated by linkage 42, lever 43 which pivots about box beam 41, linkabe 44 and gear box 45.

Further details of the steering mechanism include the steering wheel 46 operably coupled to a chain 47 via a universal joint 48. The endless chain is coupled to a splined sleeve 50 which is rotatably carried on the car. A splined shaft 51 is slidably carried in the splined sleeve 50 at one end and its opposite end is connected to a conventional peg-and-worm steering gear 52 contained in gear box 45.

A multiplicity of means are available for extending or telescoping the extendable frame sections within the fixed, tubular frame members. As illustrated, a small, reversible, fractional-HP electric motor 57 drives spur gears 58 and 59 attached to the upper, forward end of the fixed member by brackets 60 and 61 respectively. These gears engage racks 62 and 63 formed on the top surface of the extendable sections 32 and 33 so that rotation of the gears drives the sections to the extended or retracted positions, depending on the direction of rotation of the gears. Rollers 64 and 65 fixed to the underside of the fixed frame members 30 and 31 protrude through slots in these members and contact the underside of the extendable sections 32 and 33 to guide their travel and prevent binding. Suitable detenting or lock means 78 may be provided to hold the extendable frame members in the extended or retracted position. Other means of extending or retracting or telescoping the extendable sections of the frame may include such items as providing a brake system that may be selectively applied to the front and rear wheels (or both simultaneously) of the satellite car; or the provision of pawl and latching devices on the loading the unloading device 17 of the transporter vehicle that would engage the extendable portion of the car's frame. In the first instance, the front brakes of the car would be applied so that, with the rear wheels powered and the car driven forward or in reverse, the extendable frame sections 32 and 33 would be telescoped into the fixed members, reducing the wheelbase, or the extendable frame members or sections would be withdrawn from the fixed members and thus extend or increase the car's wheelbase. The second instance, as the car is driven onto the loading and unloading device 17 of the transporter vehicle, a pawl may engage the car's frame lock so that when the front end of the car contacted stops on the device, continued driving of the rear wheels would telescope the frame, shortening the car's wheelbase. As the car is backed off the platform 18 of the device 17, a reverse sequence of events would occur, extending the car's frame and increasing its wheelbase.

Referring now in detail to FIG. 5, the typical satellite car 13 is illustrated in which all details of structure are omitted except for the front suspension, steering mechanism, and frame extension and retraction mechanisms. Each front wheel is depended from an axle spindle 40 affixed to a kingpin supported in ball joints at its upper and lower end. The ball joints are contained in the ends of parallel trailing arms 38. These are pivotally attached to the front of the extendable frame sections 32 and 33. The upper arm is pivotally attached on a torsilastic spring. The steering wheel column terminates in a universal joint 48 attached to a longitudinally disposed shaft terminating at its front end, in a drive sprocket which drives a vertically oriented chain 47 dropping down to a driven sprocket affixed to a longitudinally disposed, internally splined shaft sleeve 50. An externally splined shaft 51 is slidably fitted into the sleeve 50 so it may be moved therein in a fore and aft manner as the extendable frame sections are extended or retracted and the front suspension and front wheels are moved therewith. The shaft 51 drives the peg-andworm steering gear to effect conventional Ackermann steering of the front wheels of the car.

It is also to be noted that a propulsion drive may be directed to the front wheels in a similar manner by means of universally jointed, slidably fitted, oppositely splined shafts which would accommodate the fore and aft movement of the car's front end as the extendable portions or sections of its frame are extended or retracted and its wheelbase extended or shortened.

Figure 6:
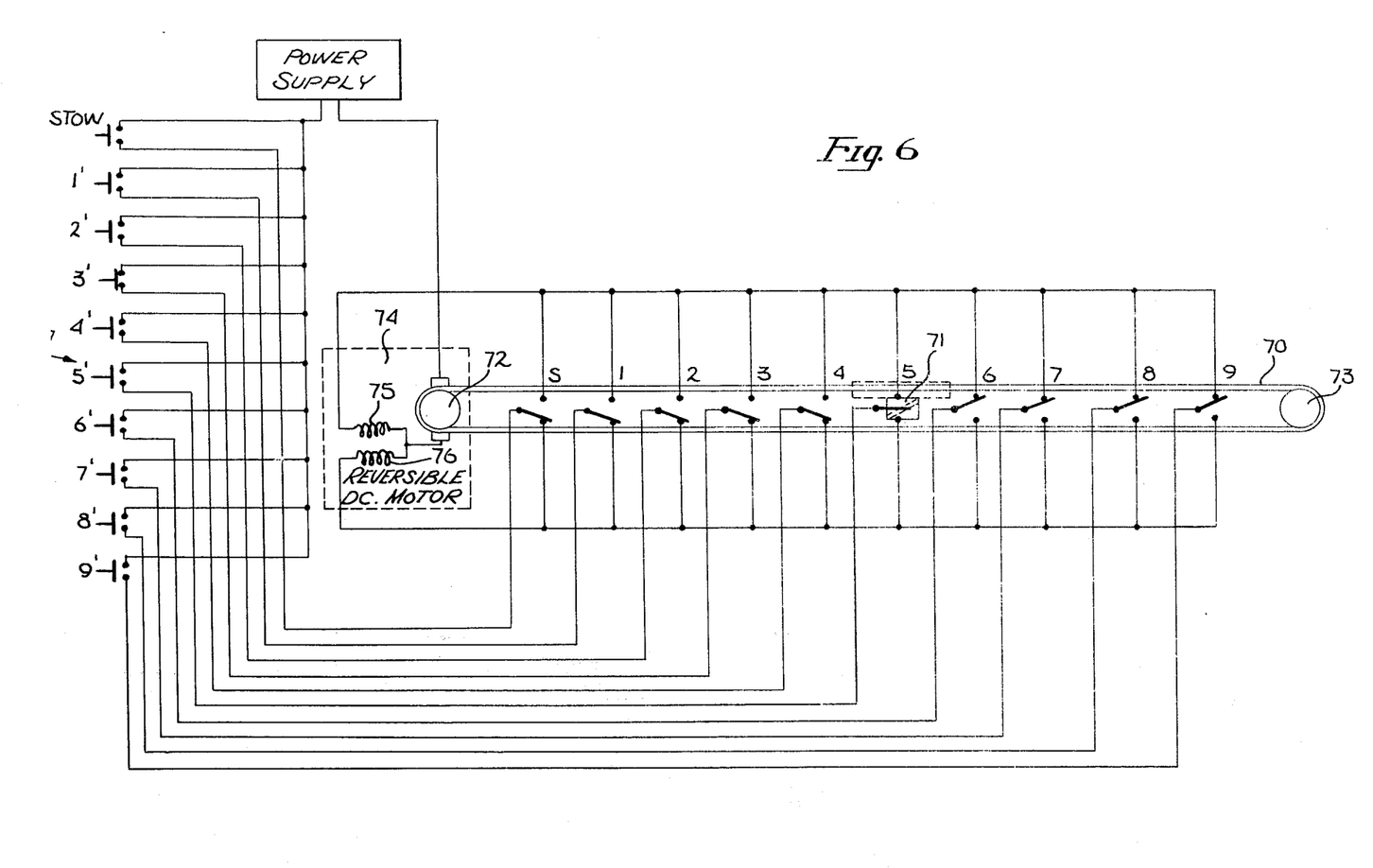
FIG. 6 is a schematic drawing of the controls for the loader mechanism carried on the transporter shown in FIGS. 1 and 2.

Referring now in detail to FIG. 6, the electromechanical schematic is illustrated showing a manner in which the longitudinal travel and positioning of the loading-/unloading device 17 may be remotely controlled from the driver's cab of the transporter vehicle. Vertical members of the device indicated in FIG. 1 by numerals 21 and 22 are attached to an endless chain 70 by means of a common joining structure 26 and the device may carry a track riding platform with a switch positioning cam indicated by the numeral 71. The endless chain 70 is trained about a drive sprocket 72 at one end of the loop and further trained about a return sprocket 73 at the other end of the loop. A reversible motor 74 drives the chain 70 which actuates the device 17 in a fore and aft direction. A number of single-pole/double-throw switches indicated by letter S' and numerals 1'–9' inclusive are positioned, one at each car space or station in the storage area, in such relation to the longitudinally disposed tracks on which the device 17 travels and in such relationship to a cam block affixed to the rear of the device that travel of the device to the aft of the vehicle places the switches it passes in contact to complete a forward travel circuit, and travel of the device in a forward direction replaces the switches it passes in contact to complete an aft or rearward travel circuit. Thus, as it is shown in the schematic, if the loading and unloading device 17 is at car space or station 5, and the driver of the transporter vehicle presses one of a plurality of station switches 1–9 inclusive mounted on a remote-control panel 77 within the cab, such as the station number 3 push-button on the control panel, the forward travel circuit is completed through the station number 3 switch contact, the winding of the reversible motor is excited which causes the rotor to move counter-clockwise, rotating the sprocket in like manner and driving the endless chain. The driving movement of the endless chain carries the loading-/unloading device 17 attached thereto forward to station number 3 where the cam block moves the switch out of contact, breaking the circuit and causing the device to stop at station number 3. The rearward travel winding is indicated by numeral 75 while the forward travel winding of the reversible DC motor 74 is indicated by numeral 76. This loading and unloading system just described for one side of the transporter is duplicated on the opposite side.

Therefore, functioning of the transportation system as disclosed herein involves the collection of the satellite cars in outlying, suburban areas, and their placement on the transporter vehicles. The transporter vehicles would convey the cars to the central city area where they would be unloaded and then proceed to their individual destinations under their own power. The return to the suburban areas would be accomplished in the same manner, with the cars collected in the central city, conveyed on the transporters to the suburbs, unloaded and then driven under their own power to individual destinations. The purpose of this system is to provide multimode, multi-function transportation, combining the advantages of mass-transit and personal-choice travel and making use of existing networks of streets, freeways, and highways as rights-of-way without interference with their originally intended function. The fundamental advantage of the system is its potential ability to greatly reduce the energy or work expended presently in performing the urban/suburban transportation function, thereby substantially reducing air pollution.

The subject invention consists of a new form of transporter vehicle equipped with its own, integral car loading/unloading device, and a new form of satellite car incorporating a means for varying its wheelbase, thereby facilitating its carriage on the transporter vehicle and enhancing its automotive performance when functioning independently under its own power.

It will be noted that the transporter vehicle is a single-element or "straight" truck incorporating a single frame or chassis on which the running gear and the upper structure (driver's cab, car deck, enclosure, etc.) are carried. The transporter vehicle may also take the form of a semitrailer/tractor combination as described in the applicant's co-pending patent. In this particular embodiment or configuration of the transporter vehicle nine (9) satellite car stations or spaces are incorporated on each side of the deck of the transporter vehicle, for a total of eighteen (18); the number of spaces obviously may be varied. A loading/unloading device is carried on each side of the transporter vehicle. Referring now to one side, this device may be positioned longitudinally in alignment with any one of the car spaces and may be alternately at the deck level of the transporter vehicle or lowered to, and raised from, ground level in the manner of a lift-gate or forklift, thereby enabling the satellite cars to be individually loaded into the longitudinally disposed spaces from the ground or street level, and conversely, unloaded thereform by a reverse procedure. The loading/unloading device structure and the mechanism causing its vertical motion is carried on guideway tracks longitudinally disposed along the length of the side of the transporter vehicle; its longitudinal or fore and aft travel along these tracks is caused by virtue of the attachment of its structure to a longitudinally disposed, endless chain driven by a motor incorporated on the frame of the transporter vehicle.

By incorporating an integral loading/unloading device on the transporter vehicle, the need for permanent collection/distribution station structures is eliminated, since the satellite cars may be collected, in numbers or singly, at any convenient point and, conversely distributed at any point. Consequently, the transportation system has been made far more flexible and the need for capital investment is now limited entirely to the acquisition of rolling stock and requires no land to be purchased for collection/distribution stations nor funds expended for station construction. The integral loading/unloading device incorporated on the transporter vehicle is also intended to facilitate the handling of consolidated cargo by the vehicle when it is not in use as a conveyance for the satellite cars, since it eliminates the need for loading docks and marks possible the selective loading or unloading of LTL (less-than-load) cargo consignments without disturbance or a need for rearrangement of other cargo on board the transporter.

The provision of a means enabling changes in the satellite car's wheelbase, and thus the ability to reduce the overall length of the car, is intended to make possible lateral loading and conveyance of the cars and the transporter vehicles and yet maintain an overall width of the transporter which will be within the legal limits for unrestricted highway travel and use. The ability to readily make changes in the satellite car's wheelbase makes possible its self-propelled, independent operation in a maximum wheelbase configuration, thereby increasing the polar moment of inertia of the car, reducing its tendency to pitch in response to irregular road surfaces and enhancing its "tracking" characteristics, making it less prone to wander in response to bumps or sidewinds. In the event of an accident such as a head-on impact with another vehicle or a fixed obstacle, the ability of the front portion of the frame to telescope into the fixed frame members without encroaching on the passenger compartment, and the impact energy that can be absorbed in such telescoping as locking and detenting means are sheared, will provide the satellite cars with an inherent safety feature.

An adaption of the reducible frame feature (the provision for telescoping the forward frame members into the fixed frame members on the satellite cars) may be incorporated in any type of automobile and provide the same added safety through progressive, energy-absorbing, rearward travel of the front frame members, front suspension, and front wheels in response to a head-on impact accident. The ability to change the wheelbase of a vehicle by the provision of a front-end assembly (wheels, suspension, steering, and drive lines) affixed to extensible frame members slidably mounted onn fixed, longitudinally disposed members may be utilized to reduce the wheelbase and, thus the overall length and cube of conventional and all-wheel drive military vehicles so that they might be more readily transported by aircraft, rail and ship.

Stowable, integral loading/unloading devices, one on each side of the carrying body of a truck, arranged for forward and aft travel on longitudinally disposed guideway tracks fitted to the frame of the truck, with longitudinal displacement, positioning and vertical travel of the devices remotely controlled from the driver's cab are intended for use in the selective loading and unloading of consolidated cargo. This type of system would eliminate the need for loading docks, speed the loading and unloading operations, and provide greater flexibility in the handling of LTL cargo by eliminating needs for rearrangement or partial unloading of cargo to reach a particular consignment. The longitudinally disposed, side-mounted guideway tracks described immediately above when incorporated on a typical truck body would serve an emergency or safety function by acting as underride guards.

Additionally, insofar as the subject invention relates to components for the aforementioned transportation system, novel aspects and advantages are found in the satellite car incorporating the extensible frame mechanism and variable wheelbase feature. When the satellite car is operated independently of the transporter vehicle, in the self-propelled mode, this mechanism provides a sufficiently long wheelbase for the car to permit ample leg room for the passengers and clearance for an Ackermann steering system. It also, by its increase of the polar moment of inertia of the car, provides a directionally stable vehicle not given to wandering on irregular surfaces and tends to damp out pitching of the car on rough surfaces. At the same time, by enabling the car's extensible frame to be retracted and the car's wheelbase appreciably shortened, the mechanism makes it possible to configure a transporter vehicle capable of carrying an economically feasible number of satellite cars with overall dimensions well within the legal limits required for unrestricted travel over existing highways, freeways, expressways and surface streets. Also, as relates to components for the subject transportation systems, and the novelty and advantages thereof, the integral loading/unloading device incorporated in the transporter vehicle makes it possible to completely eliminate the need for collection/distribution stations in the system, since the satellite cars can now obviously be placed on, or removed from, the transporter at any location. Elimination of the permanently installed depots or stations deduces capital outlays for the system, reduces maintenance costs, and cuts labor costs and no station attendants are required. Furthermore, the remotecontrol feature of the loading/unloading device, and the device's automated operation in response to commands entered on the transporter vehicle driver's control panel eliminates the need for a separate operator to run the device, and also makes its use possible by the relatively unskilled drivers of the satellite cars, since they perform no function in the loading or unloading sequence other than to drive their cars on the the elevatable platform. Elimination of the need for stations by the integral loading/unloading device provides the overall transportation system with much greater flexibility in route structuring and in changing routes in response to changes in passenger use patterns.

Referring now to those novel features and advantages of the subject invention that have a function and purpose independent of the transportation system, it will be noted that the extensible frame of the satellite car can function as an energy absorbing device in the event of a collision, and that a mechanism of ths type could be incorporated as well in conventional automobiles to perform this function. The extensible frame concept, also incorporated in conventional vehicles and in military vehicles, including all-wheel drive types, would enable a reduction in the overall or envelope dimensions of such vehicles, thereby reducing their shipping cube and greatly simplifying their transport by rail, sea, or air. And, with respect to the transporter vehicle's integral loading/unloading device, in addition to its primary function of handling satellite cars, it could be used to load and unload consolidated cargo from the transporter vehicle or, if incorporated in any other, more conveniently configured commercial cargo vehicle, it could be used to load and unload consolidated cargo from that vehicle. In the cargo handling application, the loading/unloading device makes possible the selective handling of LTL shipments without disturbing other cargo or requiring partial unloading of the transporter vehicle or other cargo carrier to reach a particular consignment. Obviously the device also eliminates the need for loading docks or materials-handling equipment at every location where it is desired to load or unload the vehicle. A further feature of the loading/unloading device installation on either the transporter vehicle, or any other cargo vehicle, is the fact that the guide rails the device moves on also serve as underride guards, so that in the event of an accident, smaller vehicles are prevented from moving under the chassis and being crushed.

While particular embodiments of the present invention have been shown and described, it will be obvious to those skilled in the art that changes and modifications may be made without departing from this invention in its broader aspects and therefore, the aim in the appended claims is to cover all such changes and modifications as fall within the true spirit and scope of this invention.

What is claimed is:

1. In a passenger vehicle having an adjustable variable length wheelbase, the combination comprising:

an elongated frame;

said frame having a rear portion operably supporting the rear wheels of said vehicle and a movable forward portion carried in slidable relationship on said rear portion for operably supporting the front wheels of said vehicle;

a body carried on said frame having a portion thereof movable with said forward frame portion in response to movement of said forward frame portion with respect to said rear frame portion;

means interconnecting said forward frame portion with rear frame portion for limiting the extension and retraction of said front frame portion including said front body portion with respect to said rear frame portion;

steering means interconnecting said rear frame portion with said front frame portion operable to lengthen and shorten respectively following the movement of said front frame portion with respect to said rear frame portion and wherein said steering means includes a splined shaft sleeve carried on said rear frame portion and an externally splined shaft carried on said front frame portion in slidably fitted relationship with said sleeve so as to be operable to relatively move in a fore and aft manner as said elongated frame portions extend and retract while allowing rotation of said sleeve and said shaft for simultaneous steering of said front wheels; and power means operably interconnecting said rear portion and said forward portion for slidably moving said forward portion away from and towards said rear portion for simultaneously moving said front frame portion with respect to said rear portion and moving said steering shaft with respect to said steering sleeve.

2. The invention as defined in claim 1 wherein said power means interconnecting said rear and said forward portion includes a rotatable shaft transversely carried on said rear portion and having a pinion gears carried on the opposite ends of said shaft; said forward portion having parallel side rails carrying linear gear teeth engaged in driving relationship with said pinion gears.

* * * * *